Dec. 26, 1922.
P. H. GILKEY.
CORN HARVESTER.
FILED APR. 3, 1920.
1,439,884.
3 SHEETS—SHEET 2.
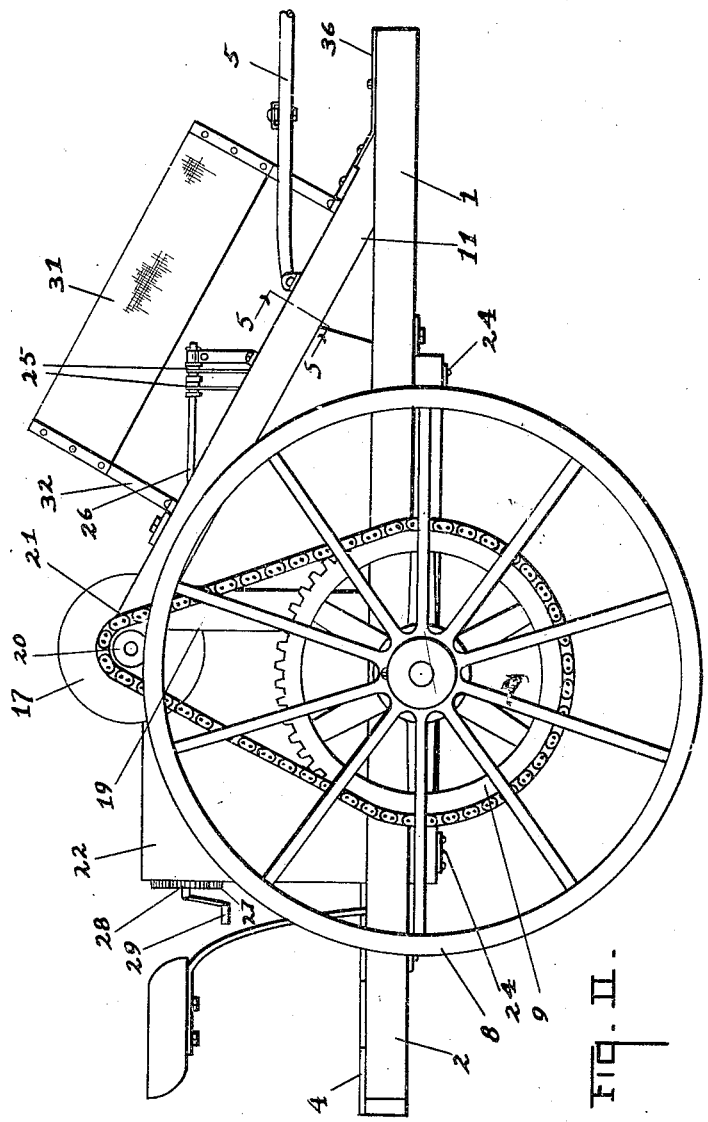
FIG. II.
Inventor
PATRICK H. GILKEY
Witness
Fred Ullrich
M. Louise Thurston
By Chappell & Earl
Attorneys Dec. 26, 1922.
P. H. GILKEY.
CORN HARVESTER.
FILED APR. 3, 1920.
1,439,884.
3 SHEETS—SHEET 3.
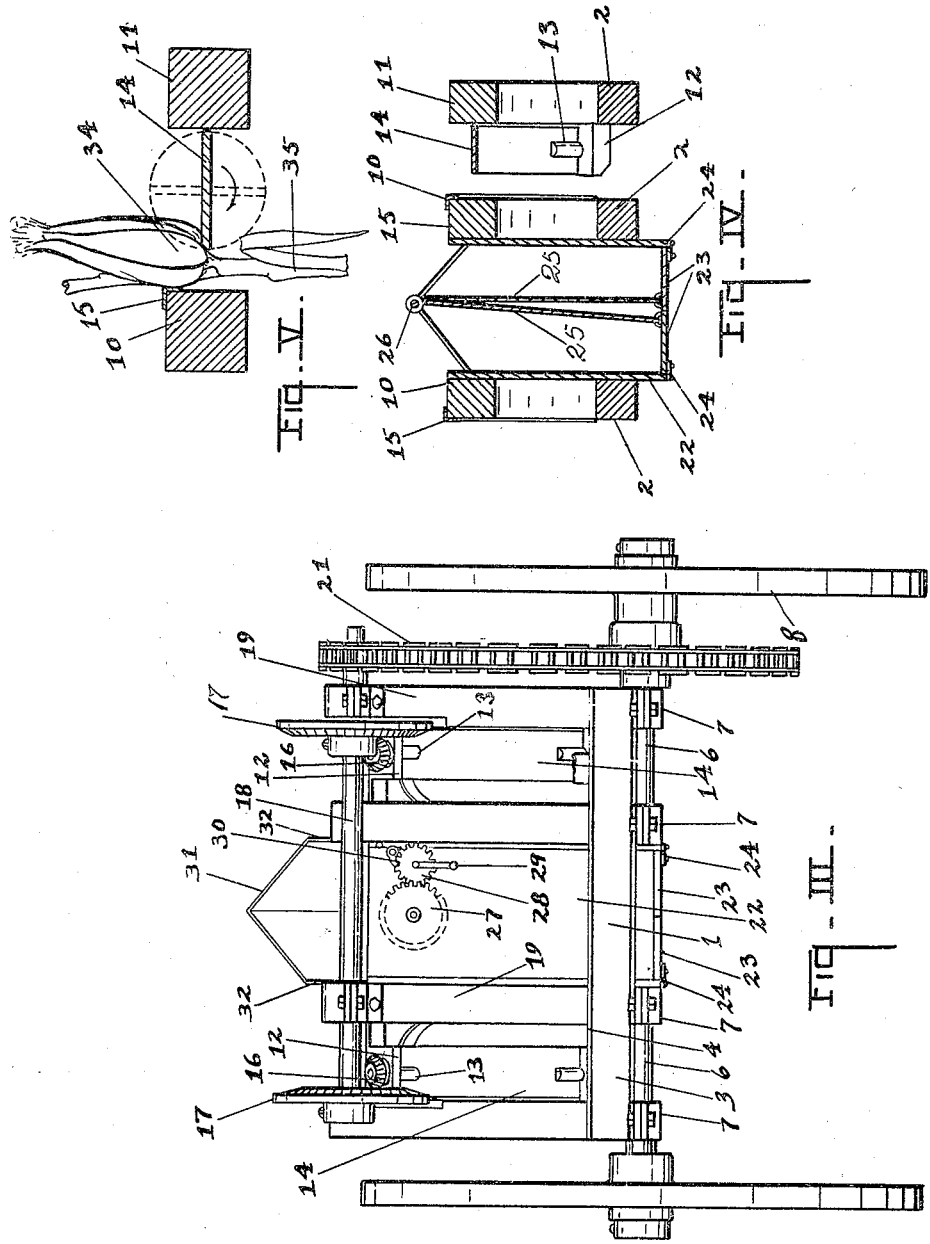
Inventor
PATRICK H. GILKEY
Witness
Fred Ullrich
M. Louise Thurston
By Chappell Earl
Attorneys Patented Dec. 26, 1922.

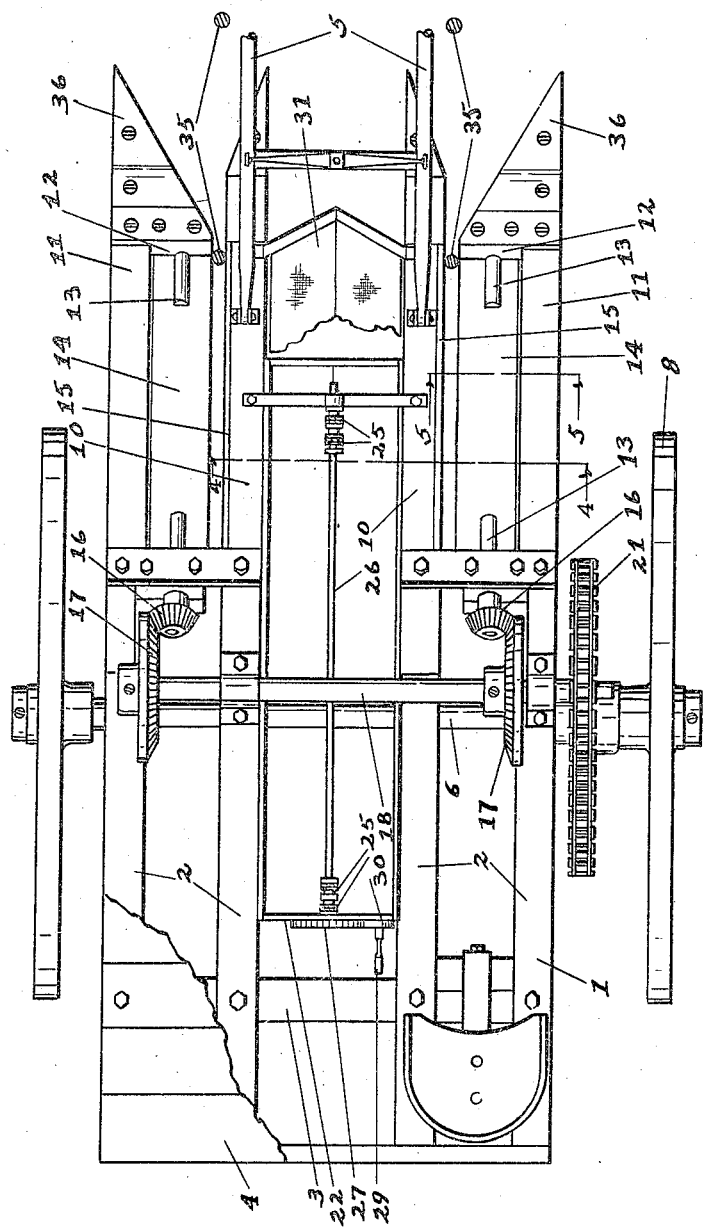

1,439,884

UNITED STATES PATENT OFFICE.

PATRICK H. GILKEY, OF RICHLAND, MICHIGAN.

CORN HARVESTER.

Application filed April 3, 1920. Serial No. 371,131.

*To all whom it may concern:*

Be it known that I, PATRICK H. GILKEY, a citizen of the United States, residing at Richland, county of Kalamazoo, State of Michigan, have invented certain new and useful Improvements in Corn Harvesters, of which the following is a specification.

This invention relates to improvements in corn harvesters.

The main objects of this invention are:

First, to provide an improved corn harvester which will effectively remove ears from standing stalks.

Second, to provide an improved corn harvester of the class described which is light in weight, simple and economical in structure and at the same time strong and durable.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Fig. I is a plan view of a structure embodying the features of my invention, parts being broken away for convenience in illustration.

Fig. II is a side elevation, the shafts being broken away.

Fig. III is a rear elevation.

Fig. IV is a detail transverse section on a line corresponding to line 4—4 of Fig. I.

Fig. V is an enlarged detail section on a line corresponding to line 5—5 of Fig. I, a stalk of grain being shown to illustrate the operation of the device.

In the drawing similar reference characters refer to similar parts throughout the several views, and the sectional views are taken looking in the direction of the little arrows at the ends of the section lines.

Referring to the drawing, I provide a main frame 1 comprising a plurality of spaced longitudinal bars 2 connected by suitable cross pieces as 3. The rear portion of the frame is provided with a platform 4. The thills 5 are provided so that a horse may walk between the two rows to be harvested. The axle 6 is secured to the under side of the longitudinal thills by means of the bearings 7.

The carrying wheel 8 is also a driving wheel, it being provided with a driving sprocket 9. At the front of the axle I mount pairs of forwardly inclined bars 10 and 11, the bars 11 being provided with bearings 12 for the journals 13 of the striker bars 14 so that the striker bars are supported in parallel and spaced relation to the bars 10 which are adapted to support the ears as illustrated in Fig. V.

These bars 10 are preferably provided with angle wear plates 15 disposed over their upper outer angles as clearly shown in Figs. IV and V. The upper journals 13 of the striker bars are provided with beveled gears 16 which mesh with gears 17 on the shaft 18 which is supported on uprights 19 on the frame. The shaft 18 is provided with a sprocket 20 connected by the sprocket chain 21 to the driving gear 9 on the wheel 8.

The driving connections for the striker bars are such that they engage the ears with an upward stroke while they are supported by the supporting bars, snapping them from their stalks and throwing them inward into the receptacle 22. This receptacle is provided with a bottom comprising sections 23 hinged at 24 so that the bottom may be dropped down to discharge the corn. These bottom sections are supported by the cables 25 wound upon the shaft 26. This shaft has a gear 27 at its rear end which meshes with the gear 28 provided with a handle 29. A pawl 30 coacts with the gear 28 to hold the bottom in its closed position.

To prevent the ears being thrown over the receptacle I provide an A-shaped guard 31 which is supported in a spaced relation above the trough by means of the brackets 32 so that as the ears are thrown upwardly by the striker bars they will strike the under side of this guard and drop into the receptacle. The stalks 35 are gathered and guided to the striker bar by means of the diverging guides 36 at the lower ends of the bars 10 and 11.

The striker bars are rotated as indicated by the arrow in Fig. V and engage the butts of ears as 34 as they are supported by the supporting bars 10, effectively removing them from the stalk without breaking the ears or shelling the grain.

My improved harvester is simple and economical in structure and light in weight so that one horse is sufficient to pull the same and at the same time it is strong and durable in structure. The ears are snapped off or broken from the stalks without crushing the stalks or stripping the leaves therefrom. As the supporting and striker bars are inclined, they engage ears at varying heights from the ground.

I have shown various parts of my improved corn harvester in conventional form and have not attempted to illustrate or describe various other modifications or adaptations which I contemplate as I believe the disclosure made will enable those skilled in the art to which my invention relates to embody or adapt my invention as may be desired.

Having thus described my invention, what I claim as new and desire to secure by Letters Patent, is:

1. In a corn harvester, the combination with a running gear, of pairs of spaced forwardly inclined bars mounted on said running gear and provided with diverging guides at their forward ends, striker bars rotatably mounted on the outer of said pairs of bars at the inner side of, parallel with and in spaced relation to the inner bars so that the stalks pass between the striker bars and the inner bars and the strikers engage the ears with an upward stroke while they are supported by the inner bars and thereby remove the ears from the stalks and throw them inwardly, a receptacle disposed between said pairs of bars to receive the ears, and driving connections from said running gear to said striker bars.

2. In a corn harvester, the combination of a forwardly inclined supporting bar and a rotatable striker bar in a spaced relation to and at the side of and in the plane of said supporting bar to strike the butts of the ears with an upward blow while the ears are supported by the said supporting bar disengaging them from the stalks passing between the striker bar and the supporting bar.

In witness whereof, I have hereunto set my hand and seal in the presence of two witnesses.

PATRICK H. GILKEY. [L. S.]

Witnesses:
 HARRY C. HOWARD,
 L. G. CALDWELL.